C. H. LIGHT.
RESILIENT WHEEL.
APPLICATION FILED JAN. 13, 1914.
1,096,380.
Patented May 12, 1914.
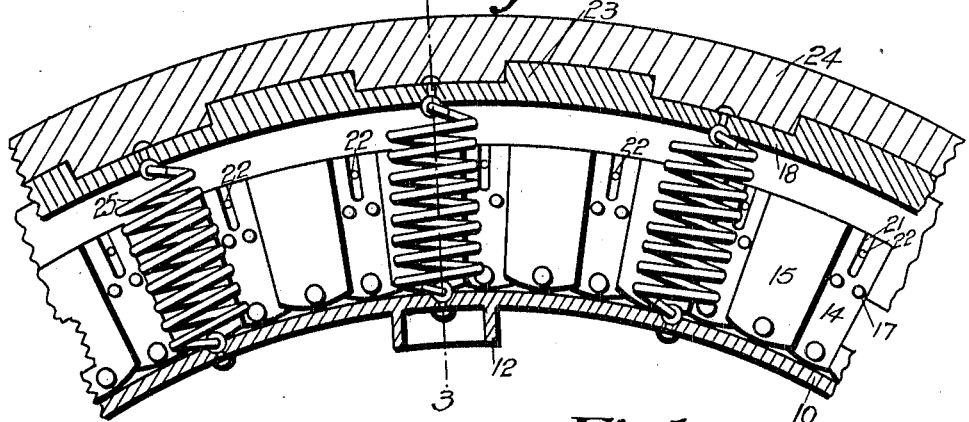
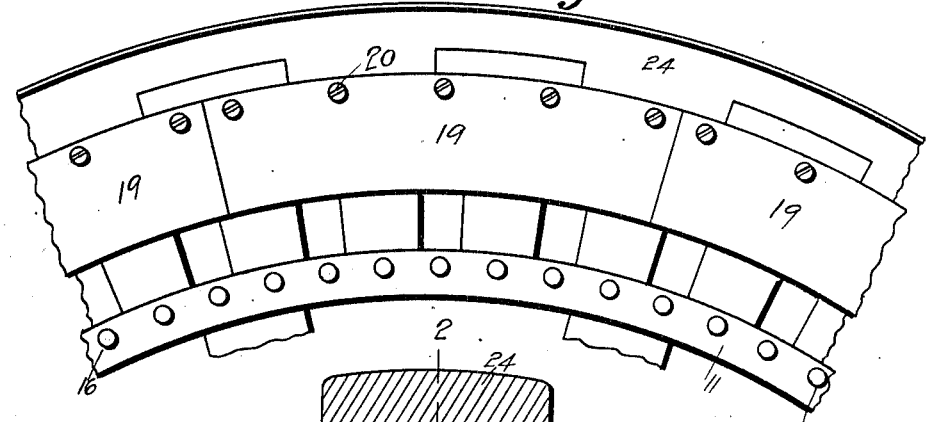
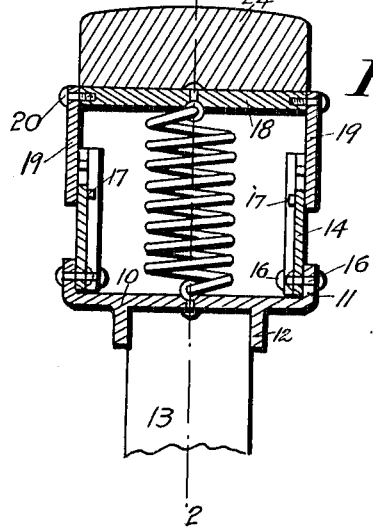
WITNESSES
INVENTOR
Claus H. Light
BY Orwig & Bair
Att'ys

UNITED STATES PATENT OFFICE.

CLAUS H. LIGHT, OF DES MOINES, IOWA, ASSIGNOR OF ONE-HALF TO CARL W. SEIPEL, OF DES MOINES, IOWA.

RESILIENT WHEEL.

1,096,380.  Specification of Letters Patent.  Patented May 12, 1914.

Application filed January 13, 1914. Serial No. 811,916.

*To all whom it may concern:*

Be it known that I, CLAUS H. LIGHT, a citizen of the United States, and resident of Des Moines, in the county of Polk and State of Iowa, have invented a certain new and useful Resilient Wheel, of which the following is a specification.

The object of my invention is to provide a resilient wheel of simple, durable and inexpensive construction.

More particularly, it is my object to provide such a wheel having an inner rim in the form of a channel with its side walls made of sections pivoted at their inner ends and operatively connected with an outer channel shaped rim in such a way as to permit movement of the outer rim vertically with relation to the inner rim but to prevent creeping thereof, the outer and inner rims being connected by yielding devices.

My invention consists in certain details, in the construction, combination and arrangement of the various parts of the device, whereby the objects contemplated are attained, as hereinafter more fully set forth, pointed out in my claims and illustrated in the accompanying drawing, in which:

Figure 1 shows a side elevation of a portion of a rim embodying my invention. Fig. 2 shows a longitudinal, central, sectional view of a portion of said rim, taken on the line 2—2 of Fig. 2, and Fig. 3 shows a transverse sectional view of said rim, taken on the line 3—3 of Fig. 2.

In the accompanying drawings I have used the reference numeral 10 to indicate generally the body of the inner rim which is in the form of a flat rim having outwardly extending flanges 11, at its edges and is provided on its under surface with sockets 12 to receive the outer ends of the spokes 13. Pivoted to the flanges 11 and extending outwardly therefrom are a plurality of segmental sections 14 and 15. The sections 14 rest against the flanges 11 and are pivoted thereto by means of bolts 16 and are spaced apart from each other in succession circumferentially around the inner rim. Sections 15 are also pivoted by means of bolts 16 to the flanges 11 which are arranged inside the sections 14 and overlap said sections. Formed or mounted on each of the sections 14 are two lugs 17 extending toward the opposite section 14 on the other side of the rim. The lugs or pins 17 of the successive sections 14 are slightly spaced from the intermediate sections 15 when all the sections are in their normal position to allow slight play of said sections 15.

The outer rim of my resilient wheel comprises a flat rim 18 having secured to its side edges inwardly extending flanges 19 overlapping the segmental sections 14 and 15, as shown in Fig. 3. The flanges 19 are detachably mounted on the rim 18 by means of bolts 20 and are made in sections or segments, as shown in Fig. 1. In each of the sections 14 is a slot 21 extending from its outer edge inwardly on radial lines. The flange sections 19 are provided with pins 22 which extend into and travel in the slot 21. The rim 18 is provided on its outer surface with spaced lugs 23 and is covered with a cushion tire 24. The lugs 23 prevent the tire 24 from creeping. Mounted between the rim members 10 and 18 are a plurality of powerful coil springs 25.

In the practical operation of my improved resilient wheel, the arrangement of the segments or sections 14 and 15, pivoted at their inner ends to the flanges 11 and mounted on the outer rim by means of the pins 22, permits the outer rim to move with relation to the inner rim to permit free resilient movement. At the same time the lugs 17 prevent any substantial creeping of the rims with relation to each other.

It will be seen that my improved wheel has a number of advantages, as shown in the last paragraph and as seen from the foregoing description. The arrangement is such that mud or pebbles will not readily get between the rim members while at the same time the outer and inner rims allow free play with relation to each other.

Many changes may be made in the details of the construction of my device without departing from its essential features and it is my object to cover by this application any such changes which may be included within the scope of the appended claims.

I claim as my invention:

1. In a wheel of the class described, an inner rim, a plurality of segmental flange members pivoted to the outer edges thereof, and extending outwardly, each flange member being arranged to overlap the two adjacent flange members, lugs on each alternate flange member designed to engage the flange members on each side thereof, overlapped by the flange member carrying the lugs and arranged to limit the pivotal movement of said flange members, a channel shaped outer rim having sides receiving said segmental flange members and provided with pins mounted in and arranged to slide radially in part of said segmental flange members, and resilient devices between said rims.

2. In a wheel of the class described, an inner rim having outwardly extending flanges at each side, segmental plates pivoted to said flanges, the plates on each side of said rim being arranged to overlap each other so that each segmental plate overlaps the two plates nearest to it, means on each alternate plate for engaging the two adjacent plates and limiting the pivotal movement thereof, part of said plates being provided with radial slots in their outer edges, a channel shaped rim having its sides receiving said segmental plates, pins extending inwardly from said sides and arranged to travel in said slots, and resilient means for connecting the two rims to each other.

3. In a wheel of the class described, an inner rim having outwardly extending flanges at each side, segmental plates pivoted to said flanges, the plates on each side of said rim being arranged to overlap each other so that each segmental plate overlaps the two plates nearest to it, means on each alternate plate for engaging the two adjacent plates and limiting the pivotal movement thereof, some of said plates being provided with radial slots in their outer edges, a channel shaped rim comprising a flat band, detachable flanges at each side thereof receiving the segmental plates on the first rim and designed to slide thereon, part of the plates of said first rim being provided with radially extended slots, pins on said detachable sides arranged in said slots, and spring devices connecting said rim.

Des Moines, Iowa, January 5, 1914.

CLAUS H. LIGHT.

Witnesses:
M. WALLACE,
L. ROBINSON.

---

Copies of this patent may be obtained for five cents each, by addressing the "Commissioner of Patents, Washington, D. C."